Patented Jan. 3, 1939

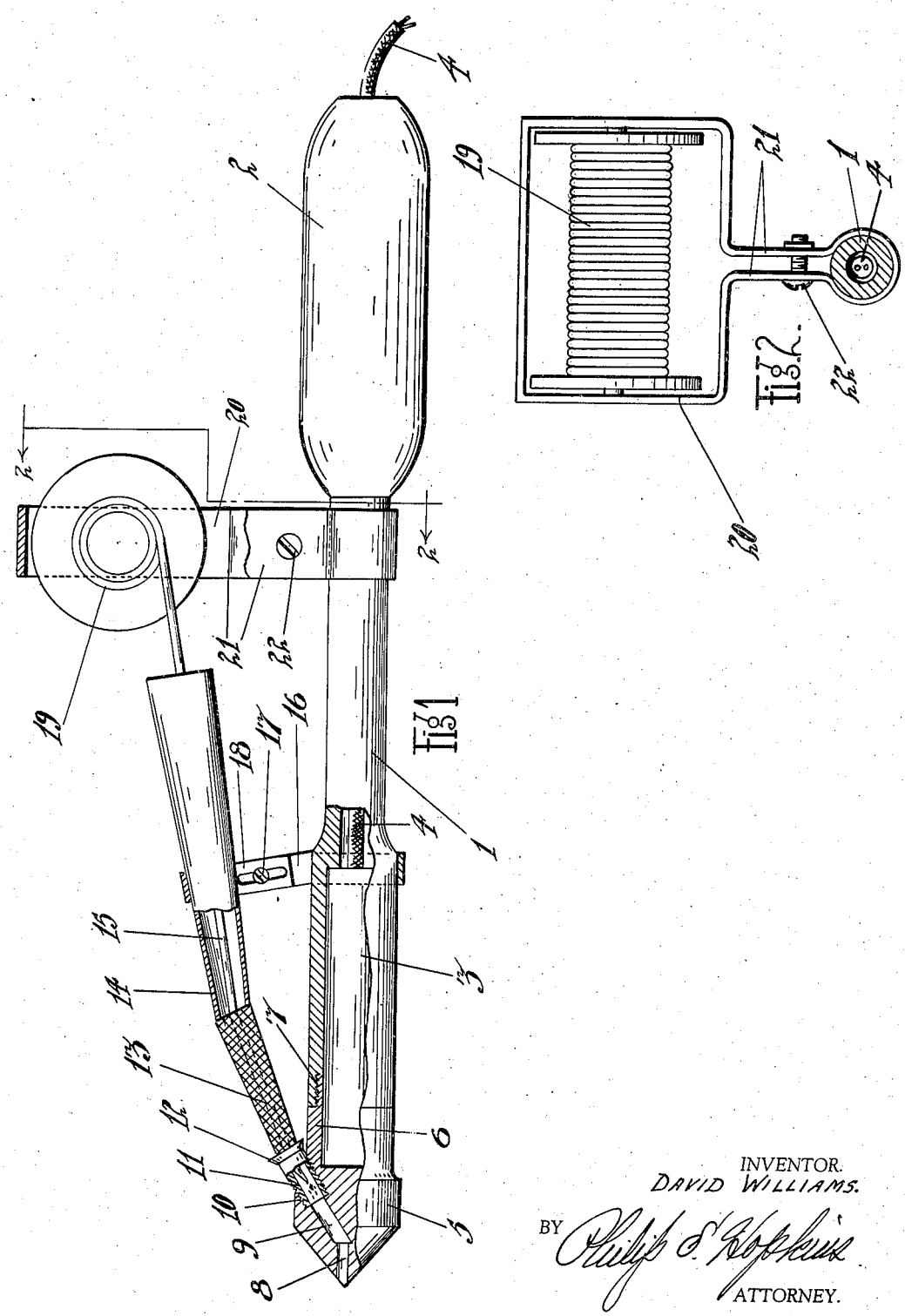

2,142,340

UNITED STATES PATENT OFFICE 2,142,340

ELECTRIC SOLDERING IRON

David Williams, Binghamton, N. Y.

Application February 6, 1936, Serial No. 62,658

2 Claims. (Cl. 113—109)

My invention relates to electric soldering irons and has for its principal object the provision of a soldering iron in which the solder is fed in wire form from a reel or the like to the soldering tip in such manner that the solder wire or ribbon is maintained cool and out of contact with the heated portion of the iron and whereby only the extreme end portion of the wire is permitted to enter the heated tip at which point it melts and is delivered through a passage in the tip to the work point.

One of the principal disadvantages of electric soldering irons equipped with means for carrying a reel of wire solder for delivery to the point, has been the melting of too large an amount of the wire adjacent the tip with resultant clogging of such tip or delivery passage, thus rendering the device ineffective for the purpose intended. By my invention I have eliminated this difficulty and in addition to providing an effective and efficient soldering iron, I have made possible a considerable saving in the solder used.

Another object of my invention lies in the provision of a novel guide means for the solder wire from the reel to the soldering tip, such guide means being provided with cooling means to a point directly adjacent the delivery point of melted solder.

A further object lies in the provision of a novel supporting means on the soldering iron for the guide by which the position thereof may be adjusted in accordance with the diameter of the reel upon which the solder wire is coiled.

Other objects and advantages will be apparent as the description proceeds, reference being had to the figures of the accompanying drawing forming a part of this application and wherein like reference numerals indicate like parts.

In the drawing:

Figure 1 is a side view of my improved soldering iron, certain parts being broken away and shown in section for clearness of illustration.

Figure 2 is a detail view partly in section taken on the line 2—2 of Figure 1.

The reference character 1 indicates generally a soldering iron of the type to which my invention is applicable and includes a handle 2 and an electric heating unit 3 carried within the hollow casing of the iron.

The current for the heating unit may be supplied through a wire 4 passing through the hollow iron and through the handle 2 to any suitable source of supply. A soldering tip 5 provided with a hollow extension 6 is suitably secured to the end of the iron 1 as by the threaded connection 7, the hollow extension 6 providing a portion of the casing receiving and surrounding the heating unit 3 whereby to bring such unit into close and direct contact with the tip 5.

The tip 5 is provided at its extreme pointed end with a passage 8 extending rearwardly a short distance and communicating with an angular passage 9 extending rearwardly and upwardly and opening into a recess 10, the inner walls of which are threaded to receive a threaded hollow thimble 11, the outer end of which is flared as at 12 to receive the end of a screen guide member 13 secured at its opposite end to a hollow substantially frusto-conical shaped guide 14 through which the solder wire 15 is adapted to pass.

It will be noted that the thimble 11 extends for a substantial distance into the tip 5 where it is subjected to the heat of the tip and the heating element 3. The outer end of the thimble, however, projects away from the tip for a substantial distance where it communicates with the open mesh guide member 13. By this means the end of the solder wire 15 passing through the wire mesh guide 13 is maintained cool and unmelted until it has entered the thimble 11 and passed thereinto for a substantial distance where it is suddenly subjected to the heat of the tip and caused to melt. The melted solder runs downwardly through the recess 10 and into the communicating channel 9 and thence to the delivery channel 8 at the point of the tip. This downward angular delivery channel arrangement insures the quick delivery of the molten solder to the end of the tip.

A bracket 16 is suitably secured around the casing 1 and adjustably mounted upon this bracket 16 as by the pin and slot connection 17 is a supporting member 18, to which is suitably secured the guide member 14. The adjustment of the bracket 18 and guide member 14 is to compensate for the varying diameter of the reel 19 of solder wire, suitably journaled in a bracket 20, the lower ends of which are brought together as at 21, and suitably clamped around the casing 1 as by means of the bolt 22, shown clearly in Figure 2.

It will thus be seen that I have provided a self-contained solder unit consisting of an electric soldering iron, tip, solder wire support, guide for the wire to the tip, and a cooling means, whereby the wire is maintained in its solid state until it actually reaches a point within the tip at which it can be promptly delivered in molten condition to the work point. Obviously the wire can be fed through the guide to the tip by simply turning the reel 19 as desired.

Of course, changes may be made by way of detail of construction and arrangement of parts without departing from the spirit and scope of my invention. I do not limit myself, therefore, to the exact form herein shown and described other than by the appended claims.

I claim:

1. A solder feeding means for a soldering iron comprising means for holding a reel of soldering wire on said iron, means for guiding said wire to the tip of said iron, means including a portion of said guiding means adjacent said tip for permitting air to engage said wire and cool the same, said means comprising an open mesh screen tube through which said wire passes to said tip, said tip having a hollow passageway therethrough for said solder, and a thimble on said tip communicating with said passageway and said screen tube.

2. A solder feeding means for a soldering iron comprising means for holding a reel of soldering wire on said iron, means for guiding said wire to the tip of said iron, means including a portion of said guiding means adjacent said tip for permitting air to engage said wire and cool the same, said means comprising an open mesh screen tube through which said wire passes to said tip, said tip having a hollow passageway therethrough for said solder, and a thimble on said tip communicating with said passageway and said screen tube, said passageway having at least a portion thereof sloping downwardly from said thimble.

DAVID WILLIAMS.